S. B. ALGER.
Friction Clutches.
No. 137,335.  Patented April 1, 1873.
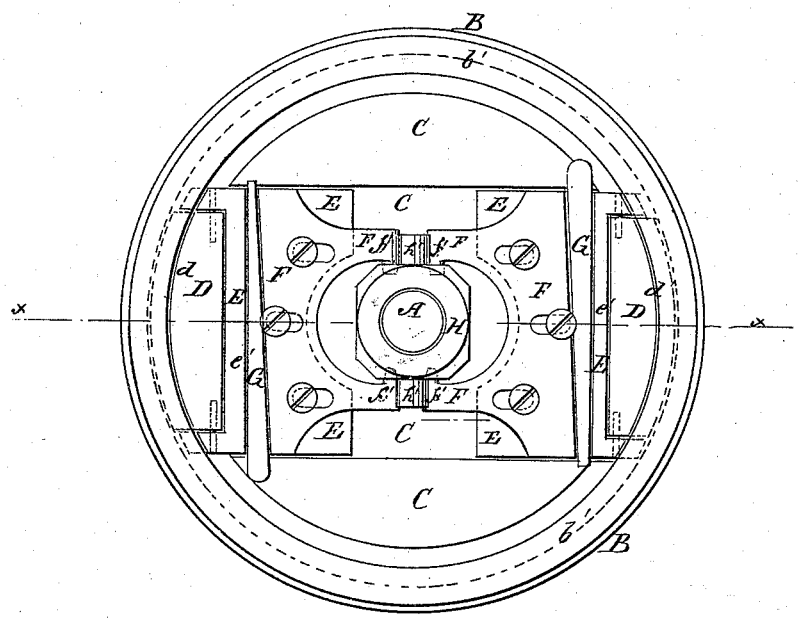
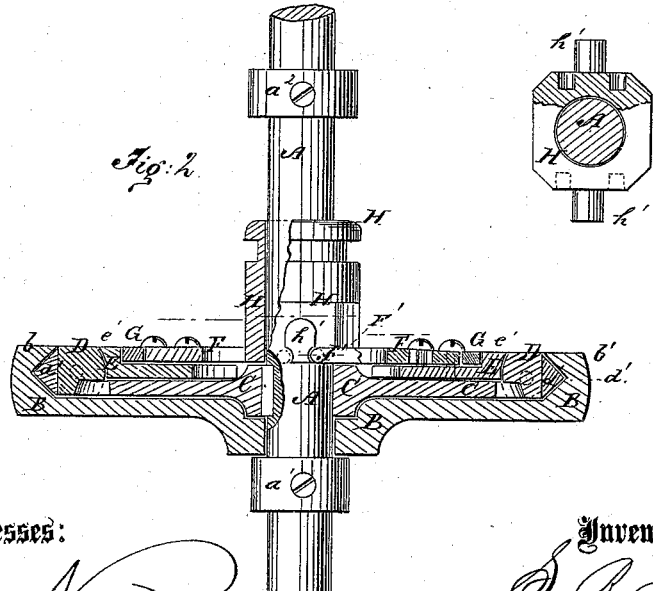
Witnesses:
Chas. Nida
C. Sedgwick
Inventor:
S. B. Alger
per Munn & Co.
Attorneys.

UNITED STATES PATENT OFFICE.

SAMUEL B. ALGER, OF OSWEGO, NEW YORK.

IMPROVEMENT IN FRICTION-CLUTCHES.

Specification forming part of Letters Patent No. 137,335, dated April 1, 1873; application filed February 8, 1873.

*To all whom it may concern:*

Be it known that I, SAMUEL B. ALGER, of Oswego, in the county of Oswego and State of New York, have invented a new and useful Improvement in Friction-Clutch, of which the following is a specification:

Figure 1 represents my improved clutch as applied to a shaft and pulley. Fig. 2 is a detail section of the same taken through the line $x\, x$, Fig. 1. Fig. 3 is a detail view of the inner end of the sleeve of the clutch.

Similar letters of reference indicate corresponding parts.

My invention has for its object to furnish an improved friction-clutch simple in construction, inexpensive in manufacture, and effective in operation, grasping the pulley promptly and firmly. The invention consists in certain combinations of parts, as hereinafter described and claimed.

A represents a shaft, upon which the loose pulley B runs. The pulley B is kept in place upon the shaft A by a collar, $a^1$, and by the center-piece C of the clutch, which center-piece is keyed or otherwise securely connected with said shaft. The center-piece is made in the form of a disk of a less diameter than the pulley B, and has a wide transverse groove formed across the middle part of its outer side. The side edges of the disk or center-piece C are notched at the ends of its transverse groove to receive the blocks D, the ends of which are pivoted to the outer edges of the plates E of the expanding arms E F G. The outer edges of the pivoted blocks D are curved to correspond with the curve of the flange or projecting rim $b'$ of the pulley B, and are made V-shaped to correspond with the V-shaped groove formed in the inner surface of the flange or rim $b'$. This construction gives a greater friction-surface to the clutch, and enables it to grasp and hold the pulley more firmly. The V-shaped curved edges of the pivoted blocks D are faced with leather. The inner ends of the plates E are notched to receive the hub of the disk C or the inner end of the sleeve H, which sleeve slides upon the shaft A, and its movement is limited by a collar. $a^2$, attached to the said shaft. The outer sides of the plates E are cut away forming shoulders $e'$ near their outer ends. F are plates placed upon and secured to the inner parts of the plates E. The outer edges of the plates F do not quite reach the shoulders $e'$ of the plates E, and are slightly inclined to fit squarely against the inclined sides of the wedge-keys G, which are driven between said edges and the shoulders $e'$ of the plates E, to enable the wear of the clutch to be conveniently taken up. The plates F are secured to the plates E by screws, which pass through short slots in the plates F and screw into the plates E, so that the arms may be readily contracted and expanded, as may be required. The inner ends of the plates F are notched to receive the sleeve H, and the ends of the arms thus formed rest against projections $h'$ formed upon the opposite sides of the sleeve H. Upon the inner edges of the ends of the arms of the plates F are formed points or straight hooks $f'$, which enter holes in the sides of the sleeve H close to the sides of the projections $h'$. One of each pair of holes in the sleeve H is made in the form of a socket, and the other in the form of a short slot, so that the expanding arms can be readily attached and detached. The outer end of the sleeve H has a ring-groove formed in it to receive the fork of the clutch-lever in the ordinary manner.

Having thus described my invention, I claim as new and desire to secure by Letters Patent—

1. The hooks $f'$ formed on the plate F, and the projections $h'$ of the sleeve H, arranged for connecting said plates and sleeve, as specified.

2. The friction-clutch formed by the combination with the shaft A and loose pulley B, provided with the grooved flange $b'$ of the pivoted friction-blocks D having their outer edges V-shaped, the center-piece C, adjustable plates E, and plates F, with the sliding-hooks $f''$, sleeve H having projections $h'$, and the wedges G, all as shown and described.

3. The wedge-keys G, in combination with the adjustable plates E F of the clutch, substantially as herein shown and described.

SAMUEL B. ALGER.

Witnesses:
GEORGE K. ORRELL,
ROBERT FOOTE.